US007607344B2

(12) United States Patent
Sachs

(10) Patent No.: US 7,607,344 B2
(45) Date of Patent: Oct. 27, 2009

(54) FACTORY-ALIGNABLE COMPACT CANTILEVER PROBE

(76) Inventor: Frederick Sachs, 857 Delaware Ave., Apt. 6, Buffalo, NY (US) 14209-2028

( * ) Notice: Subject to any disclaimer, the term of this patent is extended or adjusted under 35 U.S.C. 154(b) by 172 days.

(21) Appl. No.: 11/789,044

(22) Filed: Apr. 23, 2007

(65) Prior Publication Data

US 2008/0257022 A1    Oct. 23, 2008

(51) Int. Cl.
*G01B 5/28*    (2006.01)
*G01N 13/16*   (2006.01)

(52) U.S. Cl. ........................................................ 73/105
(58) Field of Classification Search .................. 73/105; 850/21, 33, 40, 53
See application file for complete search history.

(56) References Cited

U.S. PATENT DOCUMENTS

| | | | |
|---|---|---|---|
| 5,025,658 A | 6/1991 | Elings et al. | |
| 5,189,906 A | 3/1993 | Elings et al. | |
| 5,210,409 A | 5/1993 | Rowe | |
| 5,260,824 A | 11/1993 | Okada et al. | |
| 5,291,775 A | 3/1994 | Gamble et al. | |
| 5,388,452 A | 2/1995 | Harp et al. | |
| 5,406,833 A * | 4/1995 | Yamamoto | 73/105 |
| 5,440,920 A | 8/1995 | Jung et al. | |
| 5,481,908 A | 1/1996 | Gamble | |
| 5,489,774 A | 2/1996 | Akamine et al. | |
| 5,524,479 A | 6/1996 | Harp et al. | |
| 5,587,523 A | 12/1996 | Jung et al. | |
| 5,625,142 A | 4/1997 | Gamble | |
| 5,714,756 A * | 2/1998 | Park et al. | 250/306 |
| 5,717,132 A * | 2/1998 | Watanabe et al. | 73/105 |
| 5,763,767 A | 6/1998 | Jung et al. | |
| 5,874,669 A | 2/1999 | Ray | |
| 6,021,665 A * | 2/2000 | Hayashi et al. | 73/105 |
| 6,138,503 A | 10/2000 | Ray | |
| 6,239,426 B1 | 5/2001 | Muramatsu et al. | |
| 6,415,654 B1 | 7/2002 | Ray | |
| 6,748,794 B2 | 6/2004 | Ray | |
| 6,871,527 B2 | 3/2005 | Hansma et al. | |
| 6,877,365 B2 | 4/2005 | Watanabe et al. | |
| 6,878,444 B2 | 4/2005 | Suzuki et al. | |
| 6,910,368 B2 | 6/2005 | Ray | |
| 7,022,985 B2 | 4/2006 | Knebel et al. | |
| 7,089,787 B2 | 8/2006 | Sahin et al. | |
| 7,109,703 B2 | 9/2006 | Suzuki et al. | |

(Continued)

OTHER PUBLICATIONS

A. Beyder and F. Sachs, "Microfabricated Torsion Levers Optimized for Low Force and High-Frequency Operation in Fluids," Ultramicroscopy, 2006, pp. 838-846, vol. 106.

(Continued)

*Primary Examiner*—Daniel S Larkin
(74) *Attorney, Agent, or Firm*—James C. Simmons

(57) ABSTRACT

A scanner which includes a gradient index lens for passing and focusing beams from a radiation emitter to a cantilevered member reflective surface of a probe and from the reflective surface to a radiation detector. The lens also serves as a mechanical support for attachment of the radiation emitter and the radiation detector and is also attached to a support for the cantilevered member. The resulting fixed positions of the radiation emitter and the radiation detector relative to the reflective cantilevered member surface allows the scanner to be compact and factory focally alignable.

20 Claims, 2 Drawing Sheets

U.S. PATENT DOCUMENTS

| | | | |
|---|---|---|---|
| 7,170,048 B2 | 1/2007 | Kakemizu | |
| 7,170,054 B2 | 1/2007 | Iyoki et al. | |
| 2005/0151536 A1 | 7/2005 | Suzuki et al. | |
| 2006/0005614 A1 | 1/2006 | Sahin et al. | |
| 2006/0075803 A1* | 4/2006 | Boisen et al. | 73/31.06 |
| 2006/0272398 A1* | 12/2006 | Hwang et al. | 73/105 |
| 2007/0044545 A1 | 3/2007 | Beyder et al. | |
| 2007/0062265 A1 | 3/2007 | Beyder et al. | |

OTHER PUBLICATIONS

M. Viani et al, "Small Cantilevers for Force Spectroscopy of Single Molecules," J. Appl. Phys., 1999, pp. 2258-2262, vol. 86 (4).

G. Binnig et al, "Atomic Force Microscope," Physical Review Letters, 1986, pp. 930-933, vol. 56 (9).

D. Brayshaw et al, "Reducing a polymer to its Subunits as an Aid to Molecular Mapping," Nanotechnology, 2004, pp. 1391-1396, vol. 15.

T. Fukuma et al, "True Molecular Resolution in Liquid by Frequency-Modulation Atomic Force Microscopy," Appl. Phys. Lett., 2005, pp. 193108-1-3, vol. 86.

A. Gunning et al, "Watching Molecular Processes with the Atomic Force Microscope: Dynamics of Polymer Adsorption and Desorption at the Single Molecule Level," J. Microscopy, 2004, pp. 52-56, vol. 216.

M. Kuhn et al, "Automated Alighment and Pattern Recognition of Single-Molecule Force Spectroscopy Data," J. Microscopy, 2005, pp. 125-132, vol. 218.

D. Muller et al, "Surface Structures of Native Bacteriorhodopsin Depend on the Molecular Packing Arrangement in the Membrane," J. Mol. Biol., 1999, pp. 1903-1909, vol. 285.

H. Janovjak et al, Abstract from "Molecular Force Modulation Spectroscopy Revealing the Dynamic Response of Single Bacteriorhodopsins," Biophysical J., 2005, 1423-31, vol. 88.

S. Zou et al, Abstract from "Stretching and Rupturing Individual Supramolecular Polymer Chains by AFM," Angewandte Chemie, Int. ed., 2005, pp. 956-959, vol. 44 (6).

Z. Lu et al, Abstract from "Elastic Properties of Single Amylose Chains in Water: A Quantum Mechanical and AFM Study," J. Am. Chem. Soc., 2004, pp. 9033-9041, vol. 126 (29).

Y. Lyubchenko, Abstract from "DNA Structure and Dynamics: An Atomic Force Microscopy Study," Cell Biochemistry and Biophysics, 2004, pp.75-98, vol. 41 (1).

W. Shi et al, Abstract from "Force Spectroscopy on Dendronized Poly(p-phenylene)s: Revealing the Chain Elasticity and the Interfacial Interaction," Macromolecules, 2005, pp. 861-966, vol. 38 (3).

L. Ye et al, Abstract from "Study on the Morphology of the Hydrophobically Modified-Polyelectrolyte in Aqueous Solution by AFM measurements," J. Appl. Polymer Sci., 2004, pp. 1175-1178, vol. 93 (3).

Q. Zhang et al, Abstract from "Direct Detection of Inter-Residue Hydrogen Bonds in Polysaccharides by Single-Molecule Force Spectroscopy," Angewandte Chemie, International Edition, 2005, pp. 2723-2727, vol. 44 (18).

* cited by examiner

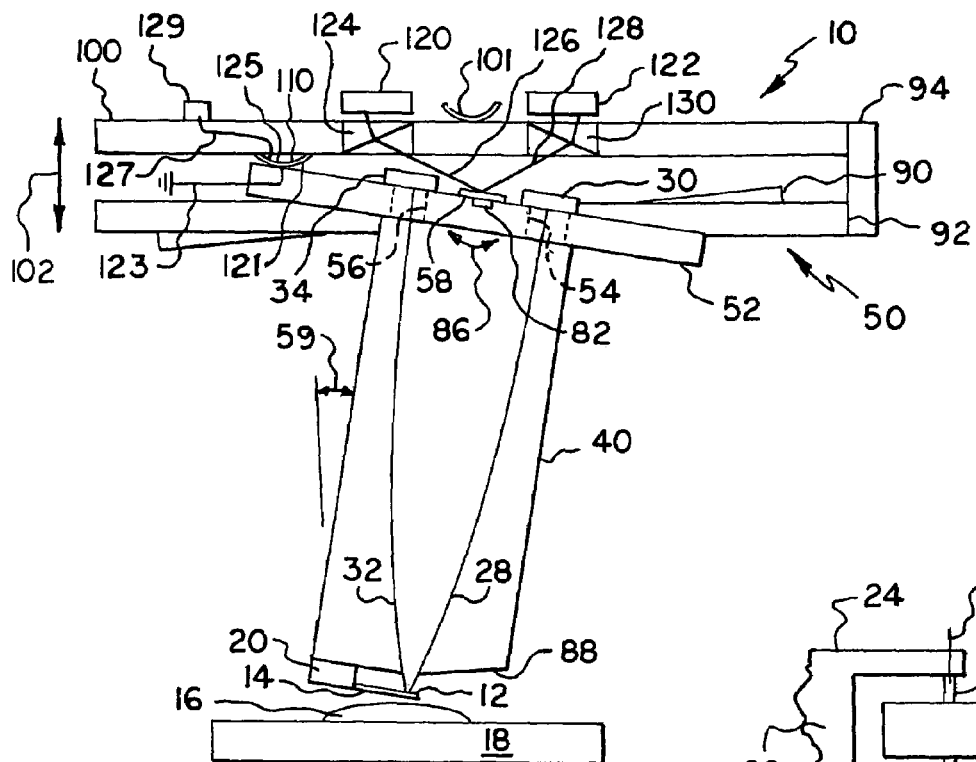
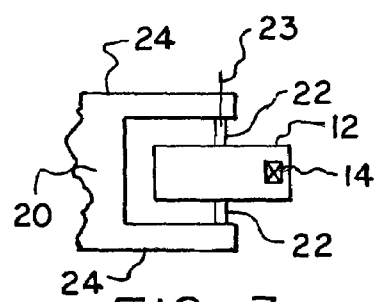
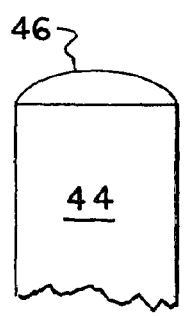
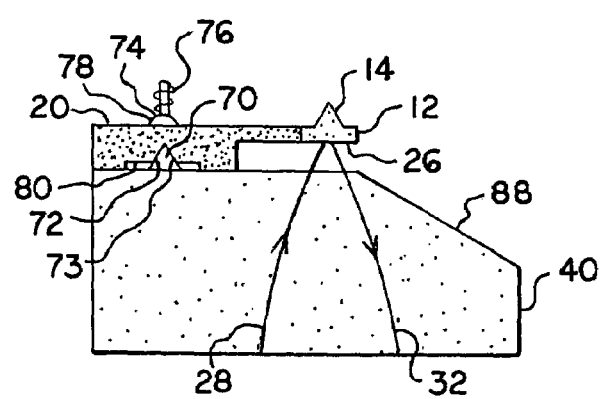
FIG. 1
FIG. 2
FIG. 3
FIG. 4

FACTORY-ALIGNABLE COMPACT CANTILEVER PROBE

The present invention relates generally to the investigation, measurement, manipulation, or otherwise sensing of the topographic features of a surface or object, particularly at the microscopic or atomic level. More particularly, the present invention relates to a scanner which utilizes a cantilevered member for probing a surface or object, such as described in U.S. patent application publication 2007/0044545, which is incorporated herein by reference and of which I am a joint inventor with Arthur Beyder, and in an article by A. Beyder and myself titled "*Microfabricated* Torsion Levers Optimized for Low Force and High-Frequency Operation in Fluids,"*Ultramicroscopy*, vol. 106, 2006, pp 838-846.

An example of an application of the present invention is a scanner or probe for an atomic force microscope (which is also referred to herein as "AFM"). As discussed in the above publication, an atomic force microscope usually utilizes a sharp stylus or tip which is on the cantilevered member and which is caused to move (rastered) over the surface or object under investigation or otherwise detect the surface or object to, for example, map the physical contour and/or the softness or hardness spectrum (derived from energy level) over the surface. The AFM was first proposed about 1986 with the idea of studying the surface properties of insulators. The technique quickly evolved from solid state material science to become a tool for biologists. Since then, the AFM has provided three-dimensional images of surface topography of live and fixed biological specimens with minimal sample preparation at a resolution comparable to the electron microscope. The AFM also has provided dynamic information about the mechanical properties such as elasticity and friction. Recent experiments have shown atomic resolution under water. The AFM can even manipulate samples such as the cutting of a chromosome (by increasing the force on the sample and using a very sharp tip and very stiff cantilevered member supporting the tip).

The stylus or tip of an AFM is supported by a stiff pad (or is integrally part of the beam) which is compliantly supported by a hinge attached to a support structure so that it acts (moves) as a spring. Thus, the orientation or deflection of the cantilevered pad changes in relation to topographic changes in the surface or object under investigation as it is moved (rastered) over the surface or object. The pad deflection is monitored typically by a laser beam reflected off the pad onto a position sensitive photodetector. Thus, the atomic force microscope may be said to be more akin functionally to a record player reading the topography of a record than to the traditional notion of a "microscope." The atomic force microscope belongs to the family of microscopes known as scanning probe microscopes. For example, the scanning tunneling microscope has a conductive tip for sensing electrical properties. For another example, the tip may be magnetized for magnetic scanning.

Art which may be of interest to the present application includes U.S. Pat. Nos. 5,025,658 and 5,189,906 to Elings et al, which disclose a compact atomic force microscope which comprises a sensor having a cantilevered arm with a probe, a light generating laser diode which emits light from one face over a distance to a reflective surface of the arm and receives reflected light therefrom, and a detector. The laser diode and cantilevered arm are an integrated structure, and the detector may be built into the structure of the laser diode. The sensor utilizes optical interference to provide laser light output from another face of the laser diode to the detector which outputs signals related to the power of the laser light received by the detector.

U.S. Pat. No. 6,021,665 to Hayashi et al discloses a scanning probe microscope including a scanner having a movable end movable in three dimensional directions and a cantilever attached to the movable end. A displacement sensor, which includes an element for applying a light beam to the cantilever and an element for receiving reflected light from the cantilever, is also attached to the scanner. A position adjusting mechanism adjusts the position of the displacement sensor so that the light beam emitted from the light emitting element can always be applied at a constant angle of incidence to a constant position on the cantilever while the moving end of the scanner is being moved.

U.S. Pat. No. RE 37,404 (reissue of U.S. Pat. No. 5,388,452) and 5,524,479 to Harp et al disclose an AFM detection system wherein a probe or cantilever is attached to the free or bendable end of a piezo-ceramic tube for movement in three dimensions to be rastered over a sample surface. A laser or other light source is attached to the other end of the tube to direct light through a lens attached to the tube for focus on the probe. The light from the probe is directed by the lens to a detector, which is shown not to be connected to the tube.

U.S. Pat. Nos. 5,874,669; 6,138,503; 6,415,654; 6,748,794; and 6,910,368 to Ray disclose a scanning probe microscope including a removable probe illuminator assembly, which supports a laser and laser focusing lens for directing light to a cantilever, which is attached to the illuminator assembly. The light is reflected from the cantilever to a beam sizing lens then to one or the other of photodiodes, which are shown not attached to the illuminator assembly. Claim 10 of the '503 patent recites a viewing lens adapted to permit optical observations of either the cantilever or sample to be observed, wherein the viewing lens is a gradient index lens. See also the fourth full paragraph in col. 10 (as well as also in col. 10 of the '368 patent) wherein it is stated that the viewing lens is mounted in the probe illuminator assembly.

Other art which may be of interest to the present invention includes U.S. Pat. Nos. 5,210,409; 5,260,824; 5,291,775; 5,440,920; 5,763,767; 6,239,426; 6,871,527; 6,877,365; 7,022,985; 7,170,048; and 7,170,054. These and all other patents/published applications discussed herein are hereby incorporated herein by reference.

FIG. 2 of the above patent application publication illustrates a scanner wherein a piezotranslator positions the support structure of the cantilevered member while its displacement or canting is monitored by what may be called an "optical lever", i.e., referring to the coupling of an emitted laser or other beam provided by a suitable radiation emitter and reflected from the back or bottomside surface (the surface opposite the surface on which the tip is located) on the cantilevered member onto a position sensitive photodetector or other radiation detector. The piezotranslator x and y positions and velocities and the z-position (height) are controlled by a general purpose computer and may be modulated in feedback. The laser beam reflection provides information about the canting of the cantilevered member in response to the work performed by the surface on the tip as it is rastered. When operated in feedback, a software feedback loop controls the piezotranslator to minimize the bending of the cantilevered member to maintain a more controlled force on the surface. While a variety of operational modes of AFM exist, such as contact (repulsive), non-contact (attractive), and intermittent contact, they can be roughly divided into the categories of constant force and constant height. In the constant force mode, the support structure is moved up and down to maintain a constant deflection (force) at the tip. In a constant height mode, the mean position of the support structure is fixed, and the force field is sampled by the tip deflection.

An ideal scanner is small, fast, free of drift, subject to minimal vibrational coupling from the environment, immune to materials around the sample, and simple to use. Nearly all of the above demands are best served by small scanners. Drift is proportional to size as is coupling to the environment. Speed also increases with reduction in mass. It is accordingly considered desirable that the scanner be small, for example, on the order of 4 cm or less in scale (i.e., each of its dimensions being roughly in the neighborhood of 4 cm) as compared to conventional scanners which are on the order of 20 cm in scale (the term "scale" referring to a typical dimension, for example, an object 1"×2"×3" might be said to have a scale of 3"). For example, it is considered desirable that the scanner fit within a small volume such as, for example, 1.5 inches cubed.

The scan heads of AFMs have been commonly made with a piezoelectric tube for X, Y, and Z (height) displacement. Sometimes, Z displacement has been handled by a separate piezotranslator. The Z position of the cantilevered member has been usually measured by reflecting a laser beam off of the reflective back of the cantilevered member and measuring the position of the reflected beam with a photodiode array. The maximum scan rate of the scan head depends upon its stiffness and mass, and drift noise depends upon the size of the scan head. Smaller such devices in general have a smaller absolute drift than larger devices. When the cantilevered member is scanned (rastered) over a sample (other than a sample being scanned under a cantilevered member), the laser emitter must remain pointed at the reflective back of the cantilevered member. This has been usually handled by a relay lens in the middle of the scanner. The whole assembly, with the laser emitter, the lens, the piezoelectric tube, and the photodiode array, undesirably makes for a rather large object with significant mass.

Small cantilevered members for reflecting the emitted radiation desirably have a higher frequency response as well as a higher intrinsic sensitivity than longer ones. However, the target size for the emitted laser beams is then correspondingly small. To make the laser spot (target) smaller requires a lens of larger aperture than commonly used in AFMs. To have a higher numerical aperture (NA) implies a shorter focal length, with the result that the lens would have to be placed closer to the cantilevered member. For conventional AFMS, this would undesirably involve larger masses and compromised mechanics of the scanner. It is thus considered desirable to provide a light weight AFM scanner for a small cantilevered member.

Focally aligning the laser emitter and photodetector with the reflective pad of such a scanner as described above is time-consuming and difficult. It is therefore considered to be desirable to be able to purchase a scanner already focally aligned as well as suitably compact.

None of the art discussed above suitably discloses such a compact factory-alignable scanner.

It is accordingly an object of the present invention to provide a scanner which is factory focally aligned and does not require continuous focal aligning during use.

It is another object of the present invention to provide such a scanner which is compact and light weight.

It is a further object of the present invention to provide such a scanner which can accommodate a small cantilevered member.

It is still another object of the present invention to be able to replace the cantilevered member without having to realign it with the radiation emitter and radiation detector.

It is yet another object of the present invention to provide such a scanner which is small in diameter so as to allow other probes to be placed near the scanning probe.

It is still another object of the present invention to minimize the number of parts making up the scanner.

In order to provide a scanner which is factory alignable as well as compact and with a minimized number of parts, in accordance with the present invention, a gradient index (GRIN) lens or other suitable lens structure is provided for passing and focusing beams from a radiation emitter to the reflective surface and from the reflective surface to a radiation detector, the lens structure also serving as a mechanical support for attachment of the radiation emitter and the radiation detector as well as the cantilever support. The resulting fixed positions of the radiation emitter and the radiation detector relative to the reflective cantilevered member surface allows the scanner to be factory focally alignable.

The above and other objects, features, and advantages of the present invention will be apparent in the following detailed description of the preferred embodiment(s) thereof when read in conjunction with the appended drawings in which the same reference numerals denote the same or similar parts throughout the several views.

BRIEF DESCRIPTION OF THE DRAWINGS

FIG. 1 is an elevational partly schematic view of a scanner which embodies the present invention.

FIG. 2 is an enlarged partial view of a lens, in accordance with an alternative embodiment of the present invention, for the scanner.

FIG. 3 is a partial plan view of a cantilevered member for the scanner.

FIG. 4 is an enlarged partial view of the scanner.

DETAILED DESCRIPTION OF THE PREFERRED EMBODIMENT(S)

Figure 5:
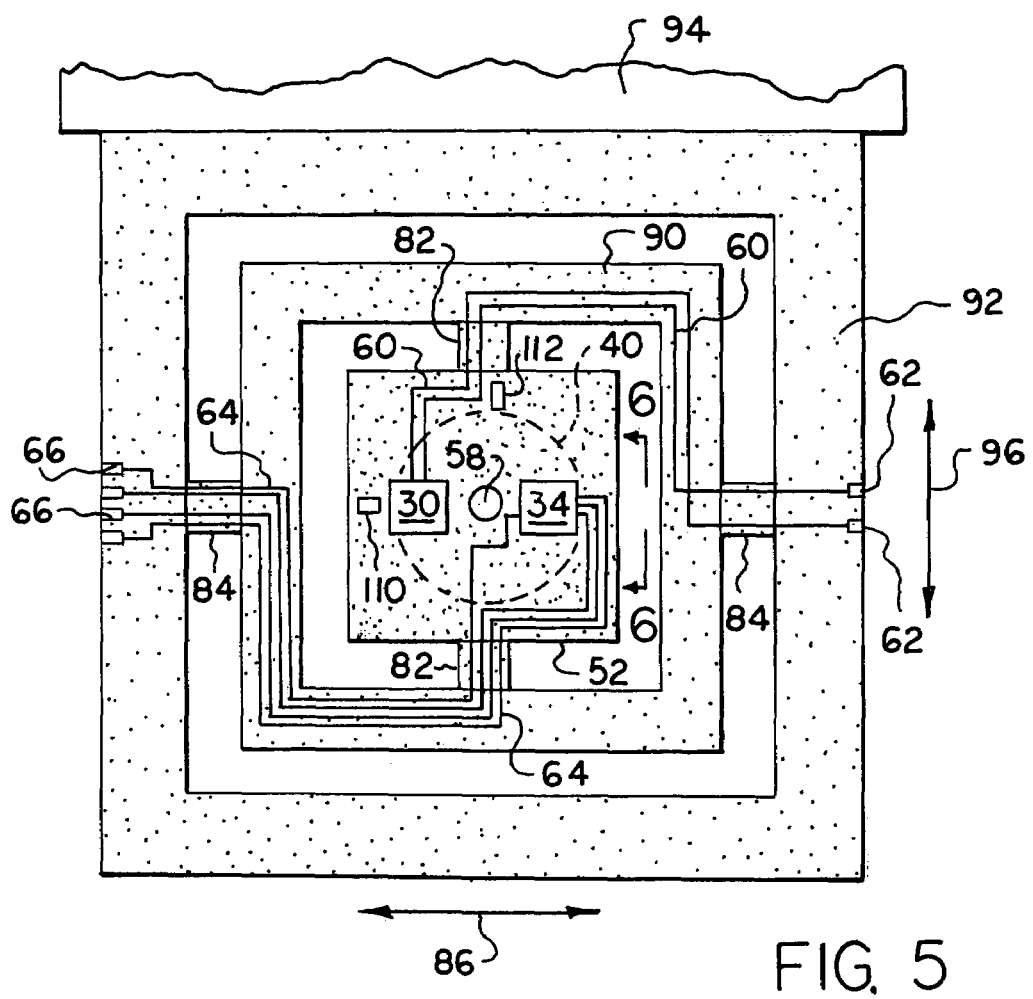
FIG. 5 is a plan view of the scanner.
Figure 6:
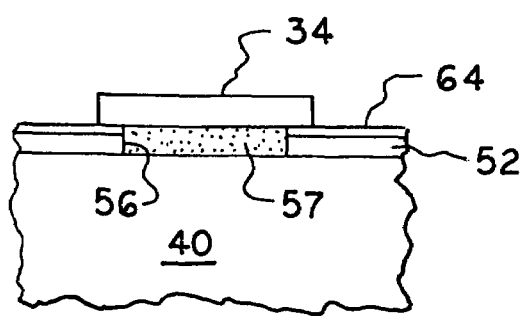
FIG. 6 is a view taken along lines 6-6 of FIG. 5.

Referring to FIG. 1, there is shown generally at 10 an atomic force microscope (AFN) scanner or probe which includes a cantilevered member 12 which has a tip 14 for engaging the surface of a specimen 16 whose surface contours or other properties are to be examined. The specimen 16 is suitably secured on a supporting member or platform 18. The cantilevered member 12 is flexibly torsionally suspended from a support 20 by a pair of co-axial torsion bars 22, i.e., having a common axis, illustrated at 23, about which the cantilevered member can twist or rotate, which are attached to support arms 24 respectively which straddle the cantilevered member 12, similarly as shown in and discussed with respect to FIG. 3 (and other figures) of the aforesaid patent application publication 2007/0044545. Alternatively, the cantilevered member 12 may be suspended by another suitable hinge or means such as, for example, the hinge shown in and discussed with respect to FIG. 1 of the aforesaid patent application publication 2007/0044545. However, since warpage of the hinges of FIG. 1 of the aforesaid patent application publication 2007/0044545 may occur resulting in misalignment focally of the cantilevered member 12, it is preferred that the hinges be torsion bars so as to maintain the desired focal alignment.

The tip 14 is rastered over the surface of the specimen 16, as discussed hereinafter, for providing contour or other measurements. The opposite side of the cantilevered member 12 has a reflective surface, illustrated at 26, provided, for example, by a thin layer of aluminum or gold. As the tip 14 is rastered over the specimen surface, the reflective surface is continuously bent or angled related to changes in the surface contour. Beams of light, illustrated at 28, or other suitable radiation are directed from a laser chip 30 or other suitable beam generator and focused, as hereinafter discussed, onto the reflective surface 26, and reflected therefrom. The reflected beams, illustrated at 32, are focused, as also hereinafter discussed, onto a beam detector 34, conveying information relative to the changes in bending or orientation of the cantilevered member 12 as it is rastered over the surface 26, from which information the specimen contour or other properties may be calculated, in a manner which is well known to those of ordinary skill in the art to which this invention pertains.

The typical scanner, as illustrated in FIG. 2 of the aforesaid patent application publication 2007/0044545, which has a beam emitter and a beam detector which are fixed separately and apart from the cantilevered member, undesirably requires continuous refocusing of the light beams as the cantilevered member is rastered over the specimen surface. In order to eliminate the need for continuous refocusing or realigning as well as to reduce the parts count and reduce the scanner size to be able to allow other probes to be placed near the scanning probe, in accordance with the present invention, a structure, illustrated at 40, is provided to which the cantilevered member support 20 and the beam emitter 30 and beam detector 34 are all attached, as discussed hereinafter) and which also serves for passage and focusing of the emitted and reflected radiation 28 and 32 respectively thereby coupling the optical lever from the radiation emitter 30 to the radiation detector 34 to remain in focused alignment. The supporting structure 40 is preferably a gradient index (GRIN) lens, which is conventionally a glass rod doped to have a radial gradient in the index of refraction, the radial gradient selected to factory-align for focusing the emitted radiation 28 to the cantilevered member back 26 and the reflected radiation 32 to the radiation detector 34, in accordance with principles commonly known to those of ordinary skill in the art to which this invention pertains. The cantilever support 20 is attached, as hereinafter discussed, along/adjacent the perimeter of the GRIN lens 40 and oriented so that the cantilevered member reflective surface 26 is generally aligned with the cylindrical axis of the GRIN lens 40. The GRIN lens 40 can be pushed in three dimensions, as discussed hereinafter, by a small piezo or other translators. The GRIN lens is stiff, light, and short, its length being about 1 to 3 cm, for example, about 1 cm, and its diameter being about 1 to 4 mm, for example, about 4 mm. As a result, its scan rate can be maximized, the drift reduced, and the preferred high numerical aperture thereof (greater than 0.5) can desirably reduce the spot size to permit the use of smaller cantilevered members, to thereby desirably allow the use of small dimension probes with a high frequency response for small dimension biological experiments. The scan head may be provided in a housing as small, for example, as 1.5 inch cubed. See Viani et al, "Small Cantilevers for Force Spectroscopy of Single Molecules," *J. Appl. Phys.*, vol. 86, 1999, pp 2258-2262, as well as the aforesaid Beyder et al article.

Biological solutions typically contain salts that can corrode metal parts. A scan head with multiple metal parts undesirably need to be coated with inert coatings such as gold to avoid corrosion. But even then defects may develop that can cause corrosion. Since the immersed parts are made entirely of glass or other inert materials (the GRIN lens entirely of glass and the cantilevered member structure entirely of inert materials), the use of the GRIN lens 40 desirably makes the scanner immune to a variety of solvents including the salt water used for biological experiments, i.e., makes the scanner free of such corrosion problems.

Referring to FIG. 2, there is shown generally at 42 an alternative embodiment of the supporting structure, which comprises a generally cylindrical member 44 which is hollow or solid and suitably made (for example, of glass) to allow the passage of the radiation 28 and 32 and which is suitably fitted with a suitable lens 46 for suitably focusing the radiation.

At its end opposite the cantilevered member 12, the end surface of the GRIN lens is suitably adhesively attached to a planar generally square (or otherwise suitably shaped) support member 52 which is part of a gimbaled support structure, generally illustrated at 50. The radiation emitter 30 and radiation detector 34 are suitably attached to the support member 52 and alignably positioned preferably at the factory, using principles commonly known to those of ordinary skill in the art to which this invention pertains, for suitable focusing of the emitted radiation 28 to the cantilevered member surface 26 and the reflected radiation 32 to the radiation detector. Thus, the radiation emitter 30 and radiation detector 34 move with the GRIN lens 40 and thus with the scan to thereby eliminate changes in alignment.

The support structure 50, also referred to herein as a "wafer," is microfabricated from a suitable material, for example, aluminum. However, the material is preferably silicon or other suitable insulative material to allow wires to be evaporated thereon, as discussed hereinafter, and the support structure 50 is preferably microfabricated from a single wafer thereof, as also discussed hereinafter.

Etched holes or ports 54 and 56, which may be filled with a suitable clear optical adhesive, illustrated at 57 for port 56, to reduce reflections, are provided in the member 52 for passage of the emitted and reflected radiation 28 and 32 respectively. A mirror 58 is suitably evaporated centrally (above the GRIN lens 40) onto the upper surface of member 52 for purposes which will be made apparent hereinafter.

In order that it may be more easily focally alignable, the radiation emitter 30 is preferably a vertical surface cavity emitting laser (VSCEL), which emits light normal to the surface to thereby allow easier alignment of the laser. Power supply leads 60 (discussed hereinafter) are soldered or otherwise suitably electrically attached to the VSCEL 30.

In order to provide position information in two orthogonal directions as normally desired, the radiation detector 34 is a quad photodetector chip (which includes photodiodes and amplifiers and other circuit components connected in accordance with principles commonly known to those of ordinary skill in the art to which this invention pertains to provide measures of height during a scan) to which power/information leads 64 (discussed hereinafter) are soldered or otherwise suitably electrically attached for operation of the photodetector 34.

Referring to FIG. 4, from time to time it may be necessary to remove and replace the cantilever structure 12 and 20. In order to do so without having to carefully focally realign, the cantilever support 20 is preferably attached to the GRIN lens 40 so that it is auto-aligned. This auto-alignment feature comprises a pyramid-shaped member 70 (or other suitably-shaped member such as dovetail which has an alignment maintaining shape) prelocated (preferably at the factory to be pre-aligned) in the proper place on the end surface of and adhesively attached (such as by a thermosetting glue, so that it doesn't become detached when heated) to the GRIN lens 40. A mating similarly-shaped cavity or well, illustrated at 72, is prelocated and formed in the cantilever support 20 using silicon microfabrication technology (typically KOH etch) in accordance with principles commonly known to those of ordinary skill in the art to which this invention pertains. In order to attach the support 20, a tiny drop of thermoplastic adhesive, illustrated at 73, is provided in the cavity 72, and the cantilever assembly 12 and 20 is then picked up with a suitable suction device 74, which includes an electrical heater 76, and placed in position so that the pyramid 70 is matingly received in the cavity 72. Then the suction device tip 78 is heated with the heater 76 to melt the thermoplastic adhesive. Capillary action pulls the tip against the support 20 against the surface of the GRIN lens 40, and, after the heat is removed, the thermoplastic adhesive will bond the support 20 to the GRIN lens 40. A small clearance space or indented area, illustrated at 80, is created around the pyramidal well 72 as the well is formed (also using the KOH etch) to prevent the adhesive from spreading. The use of the thermoplastic adhesive allows the removal of the support 20 for replacement by applying heat to melt the thermoplastic adhesive. The thermosetting adhesive is used to prevent the pyramid 70 from coming loose from the GRIN lens 40 when the thermoplastic adhesive is heated. It should be understood that, in accordance with the present invention, the pyramid 70 may alternatively be attached to the support 20 and the well 72 formed in the GRIN lens 40.

The pyramid 70 may be made of silicon nitride, plastic, or other suitable material which has a melting temperature higher than that of the thermoplastic or thermosetting adhesive. One way of making the pyramid 70 would be to fill the well 72 with epoxy and allow it to harden.

As will be discussed hereinafter, the cantilevered member 12 is caused to scan or raster over the specimen 16 by rotation in orthogonal directions about pivots, illustrated at 82 and 84, the rotation about pivot 82 illustrated at 86 in FIG. 1 (i.e., the GRIN lens is not translated across the specimen but is instead "swept" across the specimen) . The cantilever face of the GRIN lens 40 is suitably beveled or chamfered, as illustrated at 88, to provide clearance during such sweeping movements. To approach a sample 16 on a rigid substrate 18, the tip 14 should touch the sample 16 without other parts of the scanner touching it. This may be accomplished by tilting the scan head (i.e., GRIN lens 40) to favor contact with the tip 14. This tilt does not affect optical alignment since all parts (the cantilevered member structure, the beam emitter 30, and the beam detector 34 as well as the GRIN lens 40) move together. Steeper tilt angles reduce the squeeze flow viscous drag between the cantilever tip 14 and the substrate, to desirably improve cantilever frequency response.

The support structure 50 includes, in addition to planar support member 52, a planar generally square frame-shaped member 90 surrounding member 52, and a planar generally square frame-shaped member 92 surrounding member 90. The members 52, 90, and 92 may be otherwise suitably shaped. The outer member 92 is fixedly and rigidly suitably attached to a support structure 94. The outer and middle members 92 and 90 respectively are connected to each other along opposite sides by a pair of thin co-axial torsion bars 84 which allow rotation about the axes of the torsion bars 84 of the middle member 90 to effect scanning movement of the GRIN lens 40 in one direction such as the Y-direction, illustrated at 96. The inner and middle members 52 and 90 similarly are connected to each other along opposite sides by a pair of thin co-axial torsion bars 82 which allow rotation about the axes of the torsion bars 82 of the inner member 52 relative to middle member 90 to effect scanning movement of the GRIN lens 40 in the orthogonal direction, i.e., the X-direction, illustrated at 86.

Unlike the torsion bars 22 for the cantilevered member (which, as discussed in patent application publication 2007/ 0044545, are composed from a layer of silicon nitride which is applied to a silicon wafer, and the cantilevered member 12 and support 20 composed of the silicon with the layer applied), the torsion bars 82 and 84 are preferably composed of silicon to provide the desired stiffness therefor. Thus, the support structure 50 is desirably microfabricated from a single wafer of silicon or other suitable insulative material which can provide the desired stiffness, in accordance with principles commonly known to those of ordinary skill in the art to which this invention pertains. For example, the inner member 52 may have a length of about 2 cm. and a width of about 2 cm., the middle member 90 may have a length of about 4 cm. and a width of about 4 cm., the outer member 92 may have a length of about 6 cm. and a width of about 6 cm., and all three members 52, 90, and 92 may have a thickness of about 0.5 mm. However, the support structure may be made smaller with the outer member having a length and width of about 4 cm. or less (for example, 3.5 cm.), which, with the GRIN lens 40 having a length of 3 cm. or less, desirably allows the scanner 10 to be compactly contained within a volume of about 1.5 inch cubed. Each of the torsion bars 82 and 84 may have a width of about 100 microns and a thickness of about 100 microns, and the upper surface of each of the torsion bars 82 and 84 is flush with the respective upper surfaces of the members 52, 90, and 92 to which it is attached, as illustrated in FIG. 1. The specific dimensions for a specific support structure 50 may be determined using principles commonly known to those of ordinary skill in the art to which this invention pertains.

The wires 60 and 64 are preferably evaporated onto the upper surfaces of the wafer 50, including onto the torsion bars 82 and 84 as applicable, using principles commonly known to those of ordinary skill in the art to which this invention pertains, in order that, in addition to simplifying connections, the wires may be fixed in position and immobile to thereby avoid microphonics, i.e., undesired currents due to mechanical movements of the wires. The wires 60 and 64 terminate at outer edges of the outer member 92 at sockets 62 and 66 respectively for receiving plugs of power supply/information leads.

Spaced above the support structure 50 and fixed attached to the outer member 92, as illustrated by structure 94, is a generally planar member or wafer 100. The entire scanner 10 is movable vertically or in the Z-direction, as illustrated at 102, by suitable means (not shown) such as, for example, a single axis piezo drive, illustrated at 101, for fine adjustment and by a suitable conventional translation mechanism (not shown) for course adjustment.

The scan is driven by a pair of small bimorph piezo-electric disks or benders, illustrated at 110 and 112, for the X and Y directions 86 and 96 respectively. Each disk 110 and 112 is attached to the lower surface of the planar member 100 in position to bearingly push against the inner member 52, as illustrated in FIG. 1, for rotation thereof about the respective torsion bar axis 82 and 84 respectively for scanning in the respective orthogonal directions 86 and 96 respectively.

While the scan is described and shown herein as driven by small bimorph piezo-electric disks, it should be understood that the present invention is not limited thereto and that various other scan drive means or devices may be alternatively used. For example, a small linear piezo motor or other suitable motor or other suitable piezo disks may be used instead.

Since the piezo disks are similar, only the piezo disk 110 will now be described, referring to FIG. 1. The piezo disk lower contact 121 is connected to ground by ground wire 123, which is soldered to a ground plane on the middle wafer member 52. The fixed wafer 100 contains leads 127 to the opposite side 125 of the piezo disk 110 for supplying power thereto from a power source 129. A description of such a piezo bender 110 as well as piezo drive 101 is disclosed in U.S. patent application publication 2006/0005614 (see particularly FIG. 1 thereof and its accompanying description), the disclosure of which patent application publication is incorporated herein by reference. For each orthogonal axis, the scan range is controlled by how close to the respective hinge axis the center of the piezo disk is placed, the further from the hinge, the smaller the scan range and the higher the resolution. The voltage applied for bending the piezo bender to push or effect movement of the member 52 up and down is on the order of 200 volts, and the voltage is varied to achieve the desired movement at any given time. For example, a movement of the inner member 52 near its edge of five microns may effect about a fifty micron sweep of the GRIN lens 40.

Since the scanning movement of the GRIN lens 40 may not be accurately correlated to voltage applied to the piezo benders 110 and 112, a radiation emitter 120 such as, for example, a VSCEL (vertical surface cavity emitting laser) and a radiation detector 122 such as, for example, a photodetector are preferably suitably mounted and positioned on the upper wafer 100 to provide feedback to each of the respective piezo benders 110 and 112 of the X-Y scan position in the respective orthogonal direction 86 and 96 (the pair 120 and 122, being similar, for the piezo bender 112 not shown) so that the voltage applied to the piezo benders 110 and 112 may be adjusted to account for any such inaccuracy, i.e., to linearize the GRIN lens or scan position. Light (or other radiation) 126 from the emitter 120 is focused by a suitable lens 124 to the mirror 58 where it is reflected. The reflected light 128 is focused by another suitable lens 130 to the photodetector 122. The measure of the radiation 128 reflected from the mirror 58 is a measure of the GRIN lens tilt in the respective X and Y directions, illustrated at 59 for the X direction 86. The combination of the emitter 120, detector 122, lens 124, and mirror 58 arranged to provide a measure of GRIN lens tilt is defined herein as an "optical lever." The optical lever beams 28 and 32 need to be tilted with respect to the surface since the beam emitter 30 and beam detector 34 are not colinear. The angular bending of the beams can be done by an anistropic etch of the wafer to tilt the chip 50 or by adding small prisms of plastic or other suitable material.

Thus, there is provided in accordance with the present invention a scanner which is provided to be desirably compact (can be sized to fit within a volume of about 1.5 inch cubed), to be factory-alignable focally, to retain its focal alignment due to its non-warping cantilever torsion hinges, to be easy to use due to its not having to be continuously or often focally re-aligned, and to be immune (non-corrosive) to the corrosive effects of salt water in which it may be used. The scanner is also provided so that the cantilevered member can be removed and replaced without having to focally re-align it.

It should be understood that, while the present invention has been described in detail herein, the invention can be embodied otherwise without departing from the principles thereof, and such other embodiments are meant to come within the scope of the present invention as defined by the appended claims.

What is claimed is:

1. A probe comprising a structure for passing and focusing radiation beams, a cantilevered member attached to said structure for probing a specimen as said cantilevered member is rastered over the specimen, a reflective surface on said cantilevered member, a beam emitter attached to said structure to emit radiation beams for passage through said structure to said reflective surface, and a radiation beam detector attached to said structure, said structure adapted to focus radiation beams from said beam emitter to said reflective surface and from said reflective surface to said beam detector, wherein said structure is a gradient index lens.

2. A probe according to claim 1 further comprising a support attached to said structure for supporting said cantilevered member, and a pair of co-axial torsion bars connecting said cantilevered member to said support.

3. A probe according to claim 1 wherein said beam emitter is a laser light generator.

4. A probe according to claim 1 wherein said beam emitter is a vertical cavity laser light generator.

5. A probe comprising a structure for passing and focusing radiation beams, a cantilevered member attached to said structure for probing a specimen as said cantilevered member is rastered over the specimen, a reflective surface on said cantilevered member, a beam emitter attached to said structure to emit radiation beams for passage through said structure to said reflective surface, and a radiation beam detector attached to said structure, said structure adapted to focus radiation beams from said beam emitter to said reflective surface and from said reflective surface to said beam detector, the probe further comprising a support attached to said structure for supporting said cantilevered member, a protrusion on one of said support and said structure, and a cavity in the other of said support and said structure, said protrusion received in said cavity.

6. A probe according to claim 5 further comprising a thermoplastic adhesive attaching said protrusion within said cavity.

7. A probe according to claim 5 wherein said structure is a gradient index lens.

8. A probe comprising a structure for passing and focusing radiation beams, a cantilevered member attached to said structure for probing a specimen as said cantilevered member is rastered over the specimen, a reflective surface on said cantilevered member, a beam emitter attached to said structure to emit radiation beams for passage through said structure to said reflective surface, and a radiation beam detector attached to said structure, said structure adapted to focus radiation beams from said beam emitter to said reflective surface and from said reflective surface to said beam detector, the probe further comprising a support attached to said structure for supporting said cantilevered member and having a cavity therein, a protrusion on said structure and received in said cavity.

9. A probe according to claim 8 further comprising a thermoplastic adhesive attaching said member to said protrusion.

10. A probe comprising a structure for passing and focusing radiation beams, a cantilevered member attached to said structure for probing a specimen as said cantilevered member is rastered over the specimen, a reflective surface on said cantilevered member, a beam emitter attached to said structure to emit radiation beams for passage through said structure to said reflective surface, and a radiation beam detector attached to said structure, said structure adapted to focus radiation beams from said beam emitter to said reflective surface and from said reflective surface to said beam detector, the probe further comprising a gimbaled structure attached to said beam passing and focusing structure for effecting swinging movements thereof in orthogonal directions for rastering said cantilevered member over the specimen, said gimbaled structure comprising an inner and a middle member connected by a first pair of co-axial torsion bars for effecting swinging movements of said beam passing and focusing structure in one of the orthogonal directions and further comprising an outer member connected to said middle member by a second pair of co-axial torsion bars for effecting swinging movements of said beam passing and focusing structure in an other of the orthogonal directions.

11. A probe according to claim 10 wherein said beam emitter is a vertical cavity laser light generator.

12. A probe comprising a structure for passing and focusing radiation beams, a cantilevered member attached to said structure for probing a specimen as said cantilevered member is rastered over the specimen, a reflective surface on said cantilevered member, a beam emitter attached to said structure to emit radiation beams for passage through said structure to said reflective surface, and a radiation beam detector attached to said structure, said structure adapted to focus radiation beams from said beam emitter to said reflective surface and from said reflective surface to said beam detector, the probe further comprising a member attached to said beam passing and focusing structure, structure for supporting said member, said member hingedly connected to said supporting structure to move hingedly in orthogonal directions for effecting swinging movements of said beam passing and focusing structure in the orthogonal directions, and at least one device for effecting the movements hingedly of said member.

13. A probe according to claim 12 further comprising a pair of optical levers to provide feedback to said at least one device of positions of said beam passing and focusing structure in orthogonal directions respectively for linearizing a scan position.

14. A probe according to claim 13 wherein said beam emitter is a vertical cavity laser light generator.

15. A probe comprising a structure for passing and focusing radiation beams, a cantilevered member attached to said structure for probing a specimen as said cantilevered member is rastered over the specimen, a reflective surface on said cantilevered member, a beam emitter attached to said structure to emit radiation beams for passage through said structure to said reflective surface, and a radiation beam detector attached to said structure, said structure adapted to focus radiation beams from said beam emitter to said reflective surface and from said reflective surface to said beam detector, the probe further comprising a member composed of an insulative material attached to said structure, said beam emitter and said beam detector attached to said member, wires evaporated on said member and connected to said beam emitter and said beam detector for carrying signals and/or power.

16. In combination with a supporting structure, a cantilevered member for probing a specimen and for reflecting beams to a beam detector to indicate probe position, a support attached to said supporting structure for supporting said cantilevered member, a protrusion on one of said support and said supporting structure, a cavity in the other of said support and said supporting structure for receiving said protrusion, said protrusion being attached to said other of said support and said supporting structure, the combination further comprising a thermoplastic adhesive attaching said protrusion within said cavity.

17. A combination according to claim 16 wherein said protrusion is on said supporting structure.

18. A combination according to claim 16 wherein the cavity is on said support.

19. A combination according to claim 16 wherein the cavity has an alignment maintaining shape.

20. A combination according to claim 16 further comprising a pair of co-axial torsion bars connecting said cantilevered member to said support.

* * * * *